United States Patent [19]
Luke et al.

[11] Patent Number: 5,609,123
[45] Date of Patent: Mar. 11, 1997

[54] ANIMAL LITTER COMPOSITIONS AND PROCESSES FOR MAKING THEM

[75] Inventors: Donald A. Luke, Valrico, Fla.; Geoffrey S. Gagen, Chesapeake, Va.

[73] Assignee: Allied Colloids Limited, West Yorkshire, England

[21] Appl. No.: 516,195

[22] Filed: Aug. 17, 1995

[51] Int. Cl.⁶ .................................................. A01K 29/00
[52] U.S. Cl. .................................................. 119/173
[58] Field of Search .................................. 119/171, 173, 119/172

[56]  References Cited

U.S. PATENT DOCUMENTS

| | | |
|---|---|---|
| 4,685,420 | 8/1987 | Stuart . |
| 4,704,989 | 11/1987 | Rosenfeld ............................ 119/173 |
| 4,914,066 | 4/1990 | Woodrum . |
| 5,094,189 | 3/1992 | Aylen et al. . |
| 5,101,771 | 4/1992 | Goss . |
| 5,176,107 | 1/1993 | Bushur . |
| 5,183,010 | 2/1993 | Raymond et al. . |
| 5,189,987 | 3/1993 | Stanislowski et al. .................. 119/171 |
| 5,207,830 | 5/1993 | Cowan et al. . |
| 5,230,305 | 7/1993 | House ..................... 119/171 |
| 5,339,769 | 8/1994 | Toth et al. . |
| 5,421,291 | 6/1995 | Lawson et al. ......................... 119/173 |

FOREIGN PATENT DOCUMENTS 87001 8/1983 European Pat. Off. .

*Primary Examiner*—Thomas Price
*Attorney, Agent, or Firm*—Sughrue, Mion, Zinn, Macpeak & Seas

[57]  ABSTRACT

A pet litter composition comprises a particulate substrate having bonded onto its surfaces a fine particulate superabsorbent polymeric material and a particulate soluble polymer to promote clumping. When wetted with urine, the exposed superabsorbent and soluble polymer localise the urine and result in the rapid formation of a strong agglomerate that can easily be removed from the pet litter composition and that disintegrates when added to water.

14 Claims, No Drawings

ANIMAL LITTER COMPOSITIONS AND PROCESSES FOR MAKING THEM

This invention relates to new animal litter compositions which give improved and more economical performance relative to known compositions.

It is well known for owners of domestic animals such as cats to provide in the home a litter tray containing pet litter.

The pet litter usually consists wholly or mainly of a particulate material which can absorb urine. It is often considered that the absorptive capacity should be as high as reasonably possible and as a result bentonite is often regarded as a very satisfactory pet litter material. Bentonite is a high swelling clay, that is to say a clay which swells to several times its dry volume when wetted. However bentonite tends to be expensive and so it common to use less absorbent materials such as relatively low swelling or non-swelling clays or materials such as sawdust or wood shavings as the main component of pet litter.

The pet is trained to deposit urine and faeces in the litter tray. Inevitably the litter tray can give off unpleasant odours due to the presence of deposited urine and faeces. Faeces may be removed by the owner but urine remains absorbed in the litter and continues to emit unpleasant odours. In order to alleviate this problem the pet owner periodically discards the litter entirely and refills the litter box. This is uneconomical when only a portion of the litter material contains absorbed urine.

It is therefore desirable for the urine to cause agglomeration of the wetted particles of the litter into a clump, this agglomeration of wet particles being known as clumping. It is desirable that the clump should have sufficient mechanical strength that it can easily be removed by hand without significant risk of breakage. Stickiness of the wet pet litter will often tend to promote initial clumping to occur but can also have the disadvantage that the wet pet litter may tend to stick to the feet of the animal using the litter. It is desirable that the clumps should disintegrate in water, so that the material can be flushed in the toilet.

Bentonite does have adequate clumping properties, as well as good absorption properties, although it can suffer from the disadvantage of sometimes sticking to the feet of the animal. Another problem with compositions based on bentonite and other high swelling clays is that there is a risk of the animal ingesting the composition and suffering from subsequent swelling of the composition and impaction in the intestines.

In U.S. Pat. No. 4,685,420, an animal litter is described comprising a particulate porous inert solid substrate and a dry particulate water absorbent polymer in an amount sufficient to cause clumping. In the example, a proprietory dry cat litter is dry blended with dry beads of a cross linked absorbent polymer of acrylic acid and the application of urine is said to result in the formation of agglomerated balls. We have found that when we dry blend superabsorbent polymer with a Florida clay (instead of the proprietory cat litter used in the example) inadequate clumping occurs and variable results are obtained.

Various other combinations of inorganic or other substrate with polymer are known. In U.S. Pat. No. 5,094,189 it is proposed to provide clay granules which have, exposed on their surfaces, a layer of pregelatinised starch. In U.S. Pat. No. 5,176,107 a particulate absorbent substrate is mixed with an adhesive material and sodium bicarbonate. In U.S. Pat. No. 5,101,771 an organic clumping agent, preferably a cellulose ether, is distributed over individual clay particles in an oil vehicle. In U.S. Pat. No. 5,183,010 a pet litter composition comprises a particulate substrate, a particulate hydroxyl-containing polymer and an accelerator, with the intention that this will provide the rapid formation of a strong agglomerate in use. Although all these proposals are intended to cause clumping when the granules are wetted, they do not combine easily and economy of manufacture with good performance in use. Many of the clumping materials cause a gelatinous or other clump that does not quickly or easily disintegrate in water and so ought not to be flushed in the toilet.

It is well known to provide the pet litter by aggregating a substrate with other materials so as to provide the user with a moderately absorbent aggregate, with the intention that the individual aggregates will clump into an agglomerate when wetted by urine in use. One disclosure of forming aggregates is in EP 87001 in which clay particles are aggregated using binders such as swelling clays or polysaccharide. Compression moulded pellets formed from bentonite and an organic insoluble polymeric hydrocolloid are described in U.S. Pat. No. 4,914,066. Lightweight aggregates formed from a foamed cement slurry and optionally containing polymers are described in U.S. Pat. No. 5,207,830. It is proposed in U.S. Pat. No. 4,009,684 to treat an inert substrate with a water soluble copolymer so as to carry a fragrance or deodorant into the substrate.

In U.S. Pat. No. 5,339,769 a porous substrate is treated with a liquid composition containing a clumping agent. Various natural and synthetic polymers are proposed for this purpose, cellulose ethers being preferred. The substrate is generally clay but it can be mixed with water-swellable polyacrylate polymer as in U.S. Pat. No. 4,685,420. Instead of adding the clumping agent solely as a liquid composition, it is stated that the inert substrate can be granulated by dry blending with clumping agent and by adding droplets containing additional clumping agent. The amount of clumping agent has to be sufficient to bind the particles of substrate together. In the only examples which use a cross-linked polymer, the mixture is formed from 100 parts bentonite clay, 0.5 parts cross-linked polymer and 0.5 parts starch, and cellulose ether as the clumping agent in an amount of 0.75% introduced as a 1% aqueous solution. Accordingly, the amount of water is about 75 parts per 100 parts dry weight of product.

A difficulty with all processes in which soluble material is included within the aggregates is that, although this material may be useful for maintaining the integrity of the aggregate, it is not readily available for promoting useful clumping when the aggregated material is wetted with urine. Similarly, when superabsorbent material is incorporated within the aggregates, it can only exert its superabsorbent effect when the urine migrates into the aggregate, and it may cause disruption of the aggregate.

The pet litter composition must meet some further requirements in addition to having satisfactory absorption capacity for urine and having the ability to form an adequately strong, and non-sticky agglomerate when wetted. It should absorb the urine rapidly. It should minimise the escape of ammonia and reduce or remove odour. It should not contain any significant amount of free polymer particles, for instance having a size below about 200 μm, because of the handling and dust problems these can create. Also, it should have a homogeneous composition that will stay homogeneous during transport and storage.

OBJECT OF THE INVENTION

One object of the invention is to provide a pet litter composition which has good absorption capacity for urine.

Another object is to provide such a composition which absorbs urine rapidly. Another object is to provide pet litter composition which will clump into mechanically-resistant agglomerates when wetted with urine, without causing stickiness on to the feet of animals. In particular such clumps should disintegrate rapidly when added to water. Another object is to provide a pet litter composition which is homogeneous during storage and non-dusty despite being formed from a mixture of materials, and which does not swell undesirably if ingested by an animal.

SUMMARY OF THE INVENTION

A particulate pet litter composition according to the invention has a particle size at least 90% by weight 0.1 to 5 mm and which comprises 100 pbw (parts by weight) substrate particles having a size 90% by weight 0.1 to 3 mm on to which have been bonded about 1 to 15 pbw of superabsorbent particles and a clumping amount, which is within the range of about 0.1 to 10 pbw, of clumping particles, wherein the superabsorbent particles have a particle size 90% by weight below 500 µm and are formed of water insoluble, water swellable, cross linked polymeric material having an absorptive capacity at least 20 grams deionised water per gram polymer, and the clumping particles have a particle size 90% by weight below 1000 µm and are formed of water soluble polymeric material.

The novel animal litter may be made by spraying the substrate particles with a surface bonding, non-aggregating, amount of moisture, allowing the sprayed moisture to be absorbed into the surface of the substrate particles, and mixing the moistened substrate with the superabsorbent particles and the clumping particles.

The animal litter composition of the invention is substantially homogeneous and when wetted with urine can undergo rapid absorption and effective clumping to form mechanically resistant clumps, and yet does not go through a sticky phase sufficient to cause significant adhesion to the feet of the animal. The clumps can disintegrate rapidly when added to water and so can be flushed.

DESCRIPTION OF THE PREFERRED EMBODIMENTS

The particulate substrate is preferably a substantially non-swelling clay, that is to say a clay which will absorb some water but which does not have the swelling properties associated with a swelling clay. The preferred particulate substrate is Florida clay which is a blend of attapulgite, montmorillonite and bentonite, the latter being present in an amount such that the total clay only has low swelling properties. Other suitable clays are Mieggs Georgia clay and Mid Western clay from Missouri.

For instance the amount of bentonite or other true swelling clay in the clay substrate should be relatively small, for instance, below 30% by weight of the substrate. Other inorganic substrates can be used including diatomaceous earth, especially moler, for instance of the type found at Mors in Denmark, and other suitable blends of appropriate proportions of materials such as Fullers Earth, attapulgite, bentonite, hectorite, palygorskite, montmorillonite, dioctahedral smectite, hydrouse magnesium aluminium silicate and hydrous aluminium silicate or various cobinations thereof provided always that the amount of true swelling clay is not so high that the animal litter would swell unacceptably if ingested by the animal. Although inorganic particulate substrate is preferred, waste organic materials such as wood chips, shavings or sawdust or straw can be used, as can porous beads which have relatively low absorptive capacity.

It is desirable that the substrate has some absorptive capacity in order to promote the adhesion to it of the superabsorbent particles and the clumping particles, and also the absorptive capacity of the substrate is useful in order to promote the absorption of urine by the total animal litter composition. Generally therefore the absorptive capacity is at least 0.2, and usually at least 0.5, grams deionised water per gram particulate substrate. Thus, the amount of water retained in the substrate after it has been wetted by water and allowed to drain should be at least 0.2 grams per gram dry weight of substrate. If the absorptive capacity is too high then there is the risk of undesirable swelling and also the substrate may then interfere with the beneficial performance of the superabsorbent particles and the clumping particles. Accordingly the absorptive capacity is usually not more than 10 to 15 grams deionised water per gram substrate and usually it is less than 5 g/g. Values of around 1 or 2 g/g are often satisfactory. In particular, it is preferred that the substrate should be a clay having an absorptive capacity of about 0.5 to 5, preferably 0.5 to 2, g/g.

The particulate substrate can be a blend of absorbent and non-absorbent particles (for instance a minor amount of bentonite with sand or other relatively non-absorbent inorganic material) such that the resultant particulate substrate has the desired gel capacity. The particles of the substrate may be aggregates, for instance formed by bonding finer particles, but generally the particles are in the form in which they are initially produced, for instance by crushing clay or other rock, without any deliberate aggregation step.

The preferred substrate is a Florida or other clay which has the desired gel capacity and which is in the form in which it is initially mined, after appropriate milling and screening techniques. If this milling and screening results in the production of fines (for instance below 100 or 200 µm), then these fines may be agglomerated to the desired particle size and used as part of the clay. Preferably agglomerated or other clay fines do not represent more than 50%, and preferably not more than 20% by weight of the substrate. Preferably they are absent.

The particulate substrate can have any convenient size but in practice it is usually at least 90% by weight between 0.1 and 3 mm. If there is a significant proportion of very small particles, there can be handling difficulties of the dry product and so generally at least 90% by weight is above 0.2 µm. In order to provide good clumping properties and a large surface area for the adhesion of the clumping particles and superabsorbent particles, it is desirable that the substrate particle size should not be too large, and so generally at least 90% by weight of the substrate particles are below 1.5 or 2 µm. Substrate particles at least 90% in the range 0.2 to 1.5 mm, preferably 0.3 to 1 mm, are often suitable.

The insoluble superabsorbent particulate material serves to absorb the urine into the total composition as fast as possible and to localise it in as small an area as possible. In order to achieve very fast absorption, the insoluble particulate material should be on the surface of the particulate substrate and should have as large a surface area as possible. Accordingly it should be introduced into the composition in the form of particles having as small a size as is practicable. Generally the insoluble particulate material which is mixed with and bonded onto the substrate has a particle size at least 90% by weight below 500 µm, preferably at least 90% by weight below 400 and generally below 200 µm. When the insoluble material is provided in the form of a powder, at least 90% by weight of the powder is generally above 20 or 30 μm and so the material may have a size at least 90% by weight between 20 and 400, preferably 20 and 200, μm.

The superabsorbent powder fines are readily available commercially as fines from the production and handling of superabsorbent polymer materials for use in the absorption of human body fluids, such as in diapers. Accordingly the invention provides a very valuable way of utilising fines from superabsorbent manufacture and use.

If desired, the particle size can be even lower than the normal lower limit for fines, for instance down to as low as 1 μm or even 0.1 μm when they are applied from, for instance, a reverse phase emulsion.

The insoluble particulate material must have a high gel, or absorptive, capacity which in practice will always be at least twice the gel capacity of the substrate and often at least 10 times the gel capacity of the substrate. The gel capacity is at least 20 g/g, preferably at least 50 g/g and often at least 100 g/g based on deionised water. The absorption capacity for synthetic urine also is usually at least 20 g/g, preferably at least 50 g/g.

The gel capacity is not fully utilised by the urine and the superabsorbent particles normally expand rapidly when the clump is added to water (e.g., toilet flush water) and disrupt the clump into a dispersion of sbstrate particles, which can thus easily and safely be flushed away.

The polymer is formed from ethylenically unsaturated monomeric material and cross-linking agent. Typically the amount of cross-linking agent used is greater than 50 ppm, preferably greater than 100 ppm, more preferably greater than 200 ppm and may be up to 500 or 1,000 ppm of polyethylenically unsaturated cross-linker, for instance methylene-bis-acrylamide (MBA). Often the amount of cross-linking agent is around 250 to 500 ppm.

The monomers are usually non-ionic or anionic. The monomer or monomer blend is usually water-soluble. Preferred anionic monomers are carboxylic (meth) acrylic monomers, in particular (meth) acrylic acid and alkali metal, ammonium or other water-soluble salts thereof. Suitable non-ionic monomers include (meth) acrylamide.

Preferably the insoluble polymer is an anionic polymer, more preferably formed from a blend of 10 to 100 weight % carboxylic acid monomer which is generally (meth) acrylic acid monomer and 0 to 90 weight % (meth) acrylamide monomer. The polymer may be made up substantially only of carboxylic acid monomers. Usually the amount of anionic monomer is at least 50%. If desired the polymer may be a graft polymer in which the monomers are polymerised on to a small amount of starch.

The polymer may have been made by gel polymerisation followed by comminution and drying or by reverse phase bead polymerisation followed by drying and separation of the beads from the reverse phase system (and in both these processes the coarser particles are usually separated from the fines, and the fines are used in the invention). Alternatively, the polymer may be made by reverse phase emulsion polymerisation and the emulsion particles used in the invention, after azeotropic distillation or other drying of the particles. The particles may be preferentially cross-linked on their outer surface, for instance following treatment with an epoxy, multivalent metal compound or other cross linker, in known manner.

The amount of the insoluble superabsorbent particulate material generally has to be at least about 0.5 or 1, and usually at least about 2, parts by weight per 100 parts by weight substrate. Lower amounts than this tend to be ineffective. Amounts up to 15, 20 or 25 PBW, or higher, can be used but we normally find that there is no need to use more than 10 PBW of the insoluble polymer and amounts of 1 or 2 to 7, often 2 to 5, PBW are often preferred. A blend of superabsorbent polymers may be used.

The soluble, clumping particulate polymer is bonded onto the surface of the substrate particles so as to cause strong adhesion and agglomeration between the particles in the area where the urine is trapped. This results in formation of a strong, highly localised, agglomerate that can easily be removed from the pet litter. The particulate soluble polymer should be as available as possible to the urine and so should, as far as possible, be on the surfaces of the particulate substrate rather than trapped within aggregates.

The adhesiveness caused by the soluble polymer is related in part to its surface area and so the particles must not be too large as otherwise they will not provide rapid adhesiveness. At least 90% of the particles should therefore be below 1000 μm and preferably below 500 μm. It is convenient to use fines recovered from the manufacture or use of soluble polymers for other uses, for instance as viscosifiers or flocculants and so preferably the particle size is at least 90% below 40 μm and often at least 90% below 200 μm. Preferably at least 90% of the particles are above 20 or 30 μm. Smaller particles tend to be undesirable and to give inadequate adhesiveness, for instance as a result of dissolving too rapidly, but can sometimes be used.

Various water soluble particulate polymers can give adhesion when temporarily wetted and so maybe suitable for use in the invention. They may be natural materials such as gums, for instance guar gum, or carbohydrates such as starch or cellulose, but these may not facilitate rapid disintegration of the clump in water and preferably the polymer is a synthetic polymer formed from water soluble ethylenically unsaturated monomeric material in the substantial absence of cross-linking agent. A blend of clumping polymers maybe used.

The polymer may therefore be formed from the monoethylenically unsaturated monomers from which the insoluble polymer is formed and thus it may be formed from a blend containing 0 to 90 weight % (meth) acrylamide monomer and 10 to 100 weight % carboxylic acid monomer, in particular (meth) acrylic acid monomer. Often the amount of anionic monomer is 30 to 80% by weight but the polymer may be formed from substantially only carboxylic acid monomers.

Preferably the polymer has high molecular weight, for instance intrinsic viscosity IV above 4 dl/g and often above 8 dl/g and up to, for instance 30 dl/g or more. IV is intrinsic viscosity measured by suspended level viscometer at 25° C. in IN NaCl buffered to pH7.

Although it is preferred for both the soluble and insoluble polymers to be anionic (optionally blends of anionic and nonionic monomers) either or both of the polymers may be cationic (for instance a cationic homopolymer or a polymer of cationic and nonionic monomer such as acrylamide). Suitable cationic monomers include diallyldimethyl ammonium chloride or dialkylaminoalkyl (meth)-acrylate or -acrylamide (usually as acid or quaternary salt).

It is preferred that the soluble polymer or the insoluble polymer or both are formed from a blend including carboxylic acid monomer with at least some monomer units remaining in the free acid form in the final polymer. Preferably the ethylenically unsaturated monomers from which the polymers are formed include carboxylic acid monomer, of which 10 to 50% remain in the free acid form in the final polymer and 50 to 90% are in the neutralised form, generally neutralised by alkali metal such as sodium. These proportions refer to the total carboxylic acid monomer unit content of the two polymers.

Often the soluble polymer may be in substantially fully neutralised form (e.g. 90–100% neutralised) and the insoluble polymer may have a content of carboxylic acid units in the free acid form (e.g. 50 to 85% neutralised). Alternatively the insoluble polymer may have a carboxylic acid unit content which is substantially fully neutralised and the soluble polymer may contain some carboxylic units in the free acid form.

We believe that the use of polymer containing some carboxylic acid moieties in the free acid form contributes towards reducing odour problems with the pet litter. We believe the acid groups neutralise ammonia and volatile amines responsible for unpleasant odours in urine.

The amount of the soluble polymer is selected to give good strength to the agglomerate which is formed. Usually the amount of soluble polymer required to bond the agglomerate must be at least about 0.1 or 0.2, and often at least 0.5 pbw (per 100 pbw substrate) since lower amounts are unlikely to give adequate strength.

It seems to be desirable for there to be competition between the superabsorbent particles, the clumping particles and the substrate particles for the absorption of the urine with the intention that the urine will be absorbed very fast by the superabsorbent particles and will wet the surfaces of the clumping particles, but may not totally dissolve the clumping particles, and so the optimum amount of clumping polymer will depend on the rate of absorption and the total absorptive capacity of the superabsorbent particles and on the absorptive properties of the remainder of the substrate. Generally the amount is below 10 pbw and often it is below 8 pbw, although sometimes amounts higher than these are useful.

Surprisingly we find that the agglomerate strength can deteriorate as the amount of polymer increases and so usually the agglomerate-bonding amount of soluble polymer is below 4 pbw, often below 2 pbw.

The ratio by weight of insoluble to soluble polymer influences the strength of the aggregate and preferably the ratio is around 15:1 or 10:1 to 3:2, most preferably about 6:1 to 2:1. For instance in some blends the mechanical strength of the clumps deteriorates if the ratio is outside the range of about 4:1 to 2.5:1 but with other combination a ratio of 10:1 may be best.

The pet litter composition is made by bonding the particulate polymers onto the particulate substrate. This may be achieved by blending the substrate with the particulate polymers in the presence of a minor, surfacebonding, amount of moisture. If too much moisture is present then significant aggregation will occur and the mean particle in the final composition will be undesirably larger than the particle size of the substrate. It is generally desirable that there should be little or no increase in particle size as a result of combining the superabsorbent particles and clumping particles with the substrate particles when making the pet litter of the invention. For instance the weight average particle size of the particulate substrate should be at least half the weight average particle size of the substrate before the addition of the polymers and moisture. For instance the weight average particle size of the animal litter composition is generally in the range 1 to 2 times the weight average particle size of the substrate, for instance in the range 1.1 to 1.5 times the weight average particle size of the substrate. Typically the animal pet litter composition has a particle size at least 90% by weight above 0.3 mm but usually below 2 or 3 mm.

It is usually desirable for the surfaces of the substrate to have absorbed moisture in them in order to provide the bonding since that moisture activates the adhesion of dry powdered superabsorbent and clumping particles onto the substrate. The substrate itself may have some water absorbed throughout its structure but in the invention it is preferred to apply moisture to the surface of the substrate and then to mix the surface-moistened substrate with the particles, dry clumping and superabsorbent which may be added as a blend or separately.

The amount of moisture that is added to the substrate is usually at least 1% by weight since lower amounts will tend to give inadequate bonding to the polymer particles, even when the substrate already contains moisture. The amount of added moisture is usually below 10% and preferably below 5%, since too much moisture causes aggregation in preference to surface bonding. The amount of moisture is preferably below 2%. The weight average particle size of the substrate is usually in the range 0.5 to 1 mm and of the final litter 0.5 to 2 mm.

Preferably the substrate is sprayed with a mist of water droplets and allowed to absorb the water, usually during agitation, for a short period. The polymer particles are then added to and blended into the moistened substrate. Typically the absorption period between spraying the moisture and mixing the particles is at least 5 seconds but generally not more than 30 seconds, for instance 5 to 10 or 15 seconds.

The amount of the polymeric material which is not bonded onto the substrate is preferably as low as possible since if it is not bonded to the substrate it may separate from the substrate and thus will be less effective for bonding the substrate particles into strong, easily removable, aggregates. Thus at least 75% by weight, and usually at least 90% by weight, of the particulate polymer added to the moist substrate becomes bonded to the substrate.

The particulate substrate generally provides more than 70%, and usually more than 80%, for instance 85 to 95% and often 90 to 95% by weight of the total composition, with the superabsorbent particles and clumping particles preferably providing the remainder of the composition except for acceptable trace amounts of free polymer particles, if any. However the composition may include minor amounts of other conventional additives such as deodorants, perfumes and bacterio-stats, in conventional manner.

In this specification, absorption capacity values are determined by measuring the dry weight of the material under test, soaking the material in an excess of deionised water, removing all excess from the surface of the material and re-weighing the material.

Particle sizes are measured by reference to the apertures of sieves. Thus 90% between 20 and 400 µm means that 90% is too large to pass through sieve openings of 20 µm but will pass through sieve openings of up to 400 µm.

The following are examples of the invention.

EXAMPLE 1

Florida clay which is primarily montmorillonite and attapulgite and having an absorption capacity of about 0.6 g/g or slightly more was crushed to a particle size 90% by weight in the range 0.2 to 1 mm. It had a moisture content of about 2%.

While being mixed in a drum mixer, 2% moisture was sprayed onto it and 5 parts (per 100 parts clay substrate) of a particulate polymer mixture was then quickly added onto it.

This polymer mixture consisted of 4 parts of superabsorbent fines and 1 part of soluble clumping polymer particles.

The superabsorbent fines had a particle size 90% in the range 50–210 μm and were formed of cross-linked polyacrylic acid wherein 75% of the acrylic acid moieties are neutralised with sodium.

The soluble clumping polymer particles had a particle size of 50–210 μm and were formed of a copolymer of acrylic acid (in which 90% of the acrylic acid moieties are neutralised with sodium) and acrylamide and had intrinsic viscosity above 8 dl/g.

The particle size of the product was similar to the initial clay, with 90% by weight of the particles having a size in the range 0.5 to 1 mm.

This composition was used as a pet litter. When urine was deposited, the extent of spread of urine was relatively small and the area over which the urine did spread formed rapidly into a strong agglomerate that could be removed by hand. When it was added to water, it rapidly disintegrated into a suspension of clay particles.

EXAMPLE 2

When the process of example 1 was repeated but using a greater amount of moisture, namely 10%, aggregation occurred to give aggregates having a size of 1 to 5 mm and containing typically, 15 to 20 clay particles.

When this composition was used as a pet litter composition, the application of urine resulted in variable results and often gave a sticky product.

EXAMPLE 3

When the process of example 1 is repeated using a coarser fraction of the superabsorbent particulate polymer, having a particle size 90% in the range 600 to 1000 μm, the mean particle size of the pet litter composition was substantially the same as in example 1, but the application of urine to the composition resulted in weaker and smaller clumps than in Example 1.

EXAMPLE 4

When the process of Example 1 is repeated with the omission of the soluble polymer and, in a further comparison, with the omission of the soluble polymer but using five parts by weight of the swellable polymer the mean particle size of the product was about the same as in Example 1. When this composition was contacted with urine the result was a weak agglomerate that was more liable to break than the agglomerate of Example 1.

EXAMPLE 5

In a further comparison, the materials of Example 1 were merely dry blended, without pre-moistening of the clay. The composition was subjected to storage and handling similar to what would be applied to a normal commercial composition. The composition tended to separate out with the result that, when it was dispensed into a litter tray, variable performance was achieved. Some parts of the composition, when wetted with urine, gave some clumping but the polymer-rich fraction which had settled to the bottom gave a sticky agglomerate which tended to stick to the feet of the cat.

EXAMPLE 6

In a further comparison, the clay of Example 1 was dry blended with the coarse superabsorbent particulate material used in Example 3 (but without any clumping polymer and without moistening and bonding of the polymer particles on to the clay) there was less separation than in Example 5 (presumably because of the coarser size of the superabsorbent) but the clumping effect was poor and the clumps had inadequate strength to be removed from the box without risk of breakage.

EXAMPLE 7

Results similar to those in Example 1 were obtained using (a) 100 pbw mid-western Missouri clay with 3 pbw of the superabsorbent and 1 pbw of the clumping polymer or (b) 100 pbw Mieggs Georgia clay, 1 pbw of the superabsorbent and 0.1 pbw of the clumping polymer.

We claim:

1. A particulate animal litter having a particle size of 90% by weight 0.1 to 5 mm and which comprises 100 parts by weight (pbw) substrate particles having a size of 90% by weight 0.1 to 3 mm onto which has been bonded about 1 to 15 pbw superabsorbent particles and a clumping amount, within the range about 0.1 to 10 pbw, of clumping particles, wherein the superabsorbent particles have a particle size 90% by weight below 500 μm and are formed of water insoluble, water swellable, cross linked polymeric material having an absorption capacity of at least 20 g deionised water per gram polymer and the clumping particles have a particle size 90% by weight below 1000 μm and are formed of water soluble polymeric material.

2. An animal litter according to claim 1 in which the weight average particle size of the substrate is at least half the weight average particle size of the animal litter.

3. An animal litter according to claim 1 in which the weight average particle size of the substrate is between 0.5 and 1 mm and the weight average particle size of the pet litter is between 0.5 and 2 mm.

4. An animal litter according to claim 1 in which the substrate has an absorption capacity of 0.2 to 5 g deionised water per gram substrate.

5. An animal litter according to claim 1 in which the substrate is a substantially non-swelling clay.

6. A composition according to claim 5 in which the weight ratio of superabsorbent particles to clumping particles is from 5:1 to 2.5:1.

7. An animal litter composition according to claim 1 in which the superabsorbent particles have a size 90% by weight below about 200 μm.

8. A composition according to claim 7 in which the amount of the superabsorbent particles is 2 to 6 parts by weight and the amount of the clumping particles is 0.5 to 3 parts by weight.

9. An animal litter composition according to claim 1 in which the superabsorbent particles have a size 90% below about 200 μm and the substrate is a clay having an absorption capacity of 0.2 to 5 g deionised water per gram clay.

10. A composition according to any preceding claim in which the clumping particles have a particle size at least 90% by weight 20 to 700 μm and are formed of a water soluble polymer which is a polymer of water soluble ethylenically unsaturated monomer material and has intrinsic viscosity above 8 dl/g.

11. A composition according to claim 1 in which the soluble polymer of the clumping particles and the insoluble polymer of the superabsorbent particles are both formed from monomers which include carboxylic acid monomers and in which 10 to 50% by weight of the total amount of carboxylic monomers in the two polymers are in the free acid form.

12. A particulate animal litter composition having a particle size of 90% by weight 0.3 to 2 μm and which comprises 100 pbw substantially non-swelling clay particles having a size 90% by weight 0.2 to 1.5 μm and an absorption capacity of 0.2 to 5 grams deionised water per gram clay and onto which have been bonded 1 to 6 pbw superabsorbent particles and 0.1 to 3 pbw of clumping particles, wherein the superabsorbent particles have a particle size 90% by weight 20 to 200 μm and are formed of water insoluble, water swellable cross linked polymeric material derived from polymerisation of ethylenically unsaturated monomer including carboxylic monomer of which at least 10% by weight is in the free acid form and wherein the superabsorbent particles have an absorption capacity of at least 20 g deionised water per gram polymer, and the clumping particles have a particle size of at least 90% by weight 20 to 700 μm and are formed of water soluble polymer which is a polymer of water soluble ethylenically unsaturated monomeric material including carboxylic monomer and has intrinsic viscosity above 8 dl/g and wherein at least 10% by weight of the total amount of carboxylic monomer in the two polymers is in the free acid form.

13. A method of making a composition according to claim 1 comprising spraying the particulate substrate with a surface bonding, non-aggregating, amount of moisture, allowing the sprayed moisture to be absorbed onto the surface of the substrate and mixing the substrate with the superabsorbent particles and the clumping particles.

14. A method of making a composition according to claim 12 comprising spraying the particulate substrate with a surface bonding, non-aggregating, amount of moisture, allowing the sprayed moisture to be absorbed onto the surface of the substrate and mixing the substrate with the superabsorbent particles and the clumping particles.

* * * * *